(No Model.)  
4 Sheets—Sheet 2.
H. H. PIEPER.
CORN AND COTTON PLANTER.
No. 514,868. Patented Feb. 13, 1894.
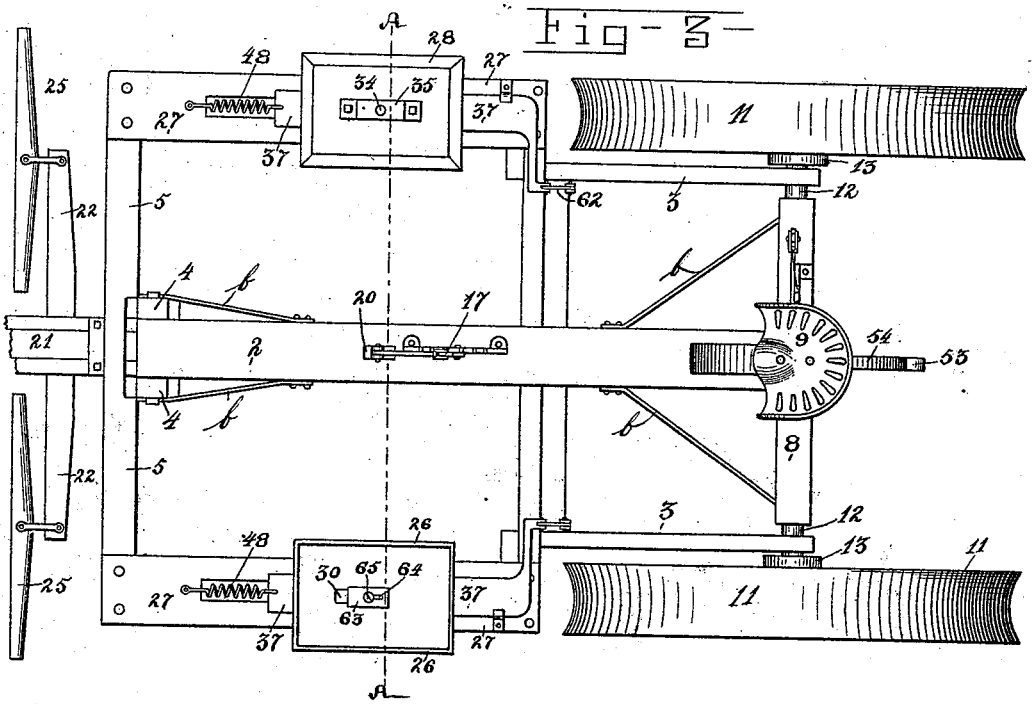
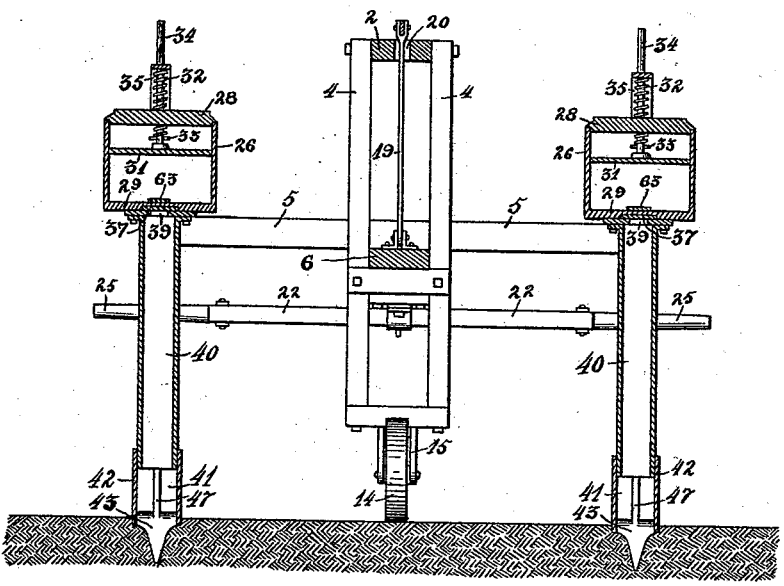
Witnesses  
W. J. Sandey.  
T. W. Thomas
Inventor  
Henry H. Pieper,  
By Higdon & Higdon & Longan  
Att'ys.

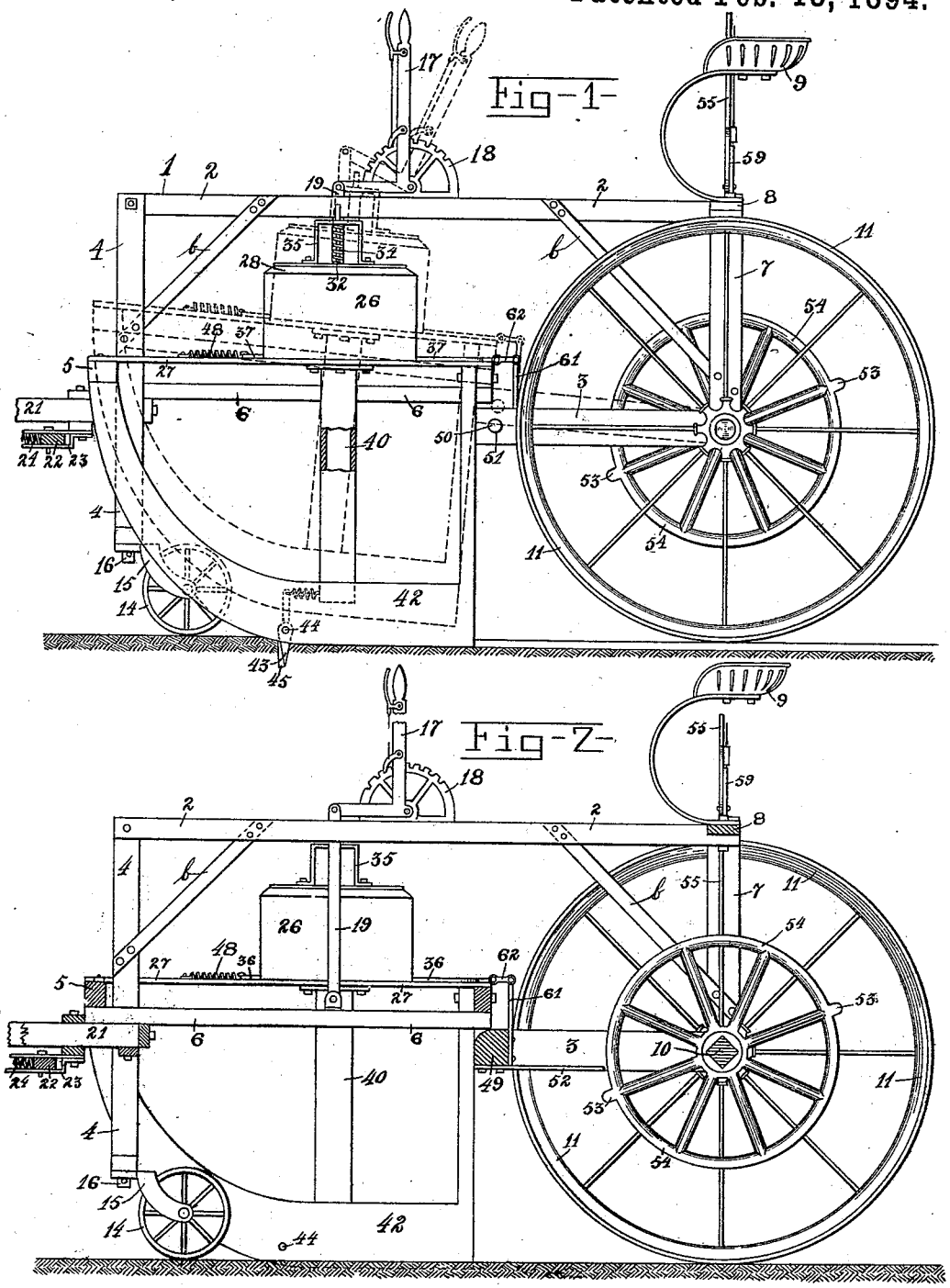

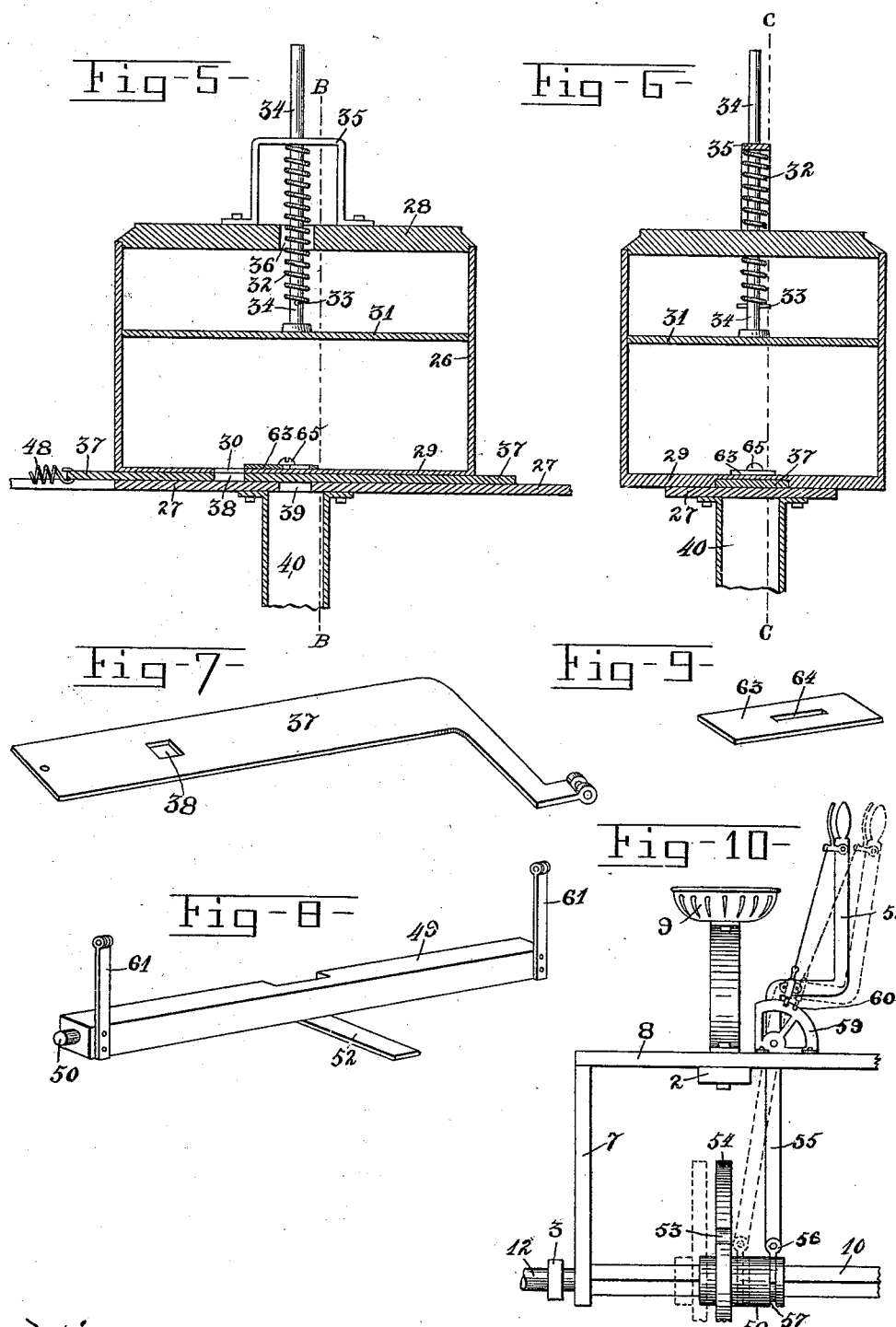

(No Model.) 4 Sheets—Sheet 4.
H. H. PIEPER.
CORN AND COTTON PLANTER.
No. 514,868. Patented Feb. 13, 1894.
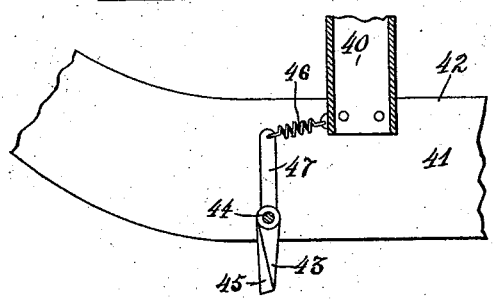
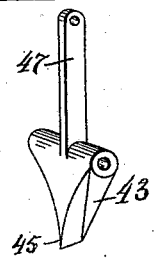
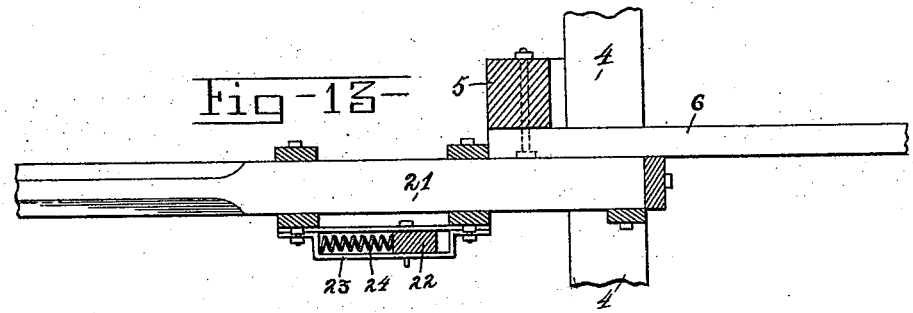
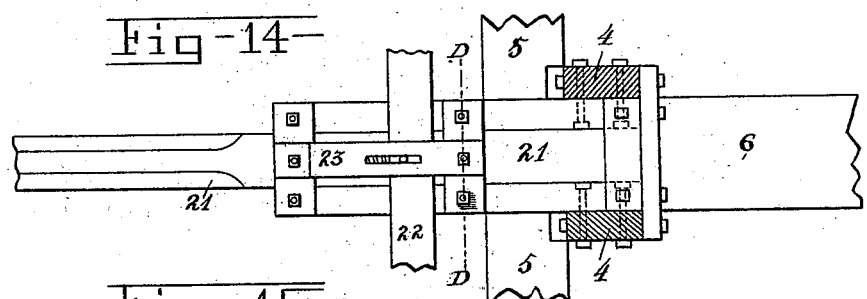
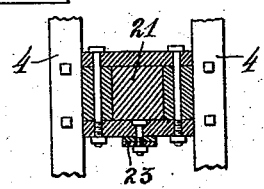
Witnesses
W. J. Sankey.
T. W. Thomas
Inventor,
Henry H. Pieper.
By Higdon, Higdon & Longan,
Attys.

UNITED STATES PATENT OFFICE.

HENRY H. PIEPER, OF ST. LOUIS, ASSIGNOR OF ONE-HALF TO EDWARD LONG, OF FRENCH VILLAGE, MISSOURI.

CORN AND COTTON PLANTER.

SPECIFICATION forming part of Letters Patent No. 514,868, dated February 13, 1894.

Application filed April 24, 1893. Serial No. 471,549. (No model.)

*To all whom it may concern:*

Be it known that I, HENRY H. PIEPER, of the city of St. Louis and State of Missouri, have invented certain new and useful Improvements in a Combined Automatic Corn and Cotton Planter, of which the following is a full, clear, and exact description, reference being had to the accompanying drawings, forming a part hereof.

My invention relates to improvements in a "combined automatic corn and cotton planter," and consists in the novel construction, combination and arrangement of parts hereinafter described and pointed out in the claims.

The invention pertains to that class of machines which are arranged to plant two rows at once, the operator riding on the machine, and the seed slides being operated by connection with the axle.

In the drawings: Figure 1 is a side elevation of a machine embodying my improvements, with slight portions shown in section. Fig. 2 is a sectional side elevation of a machine embodying my invention. Fig. 3 is a plan view of same. Fig. 4 is a sectional end elevation taken on line A—A of Fig. 3 and looking toward the left hand of said figure. Fig. 5 is a detail sectional elevation of one of the seed-boxes used in the machine, taken on a line C—C of Fig. 6. Fig. 6 is a similar view taken on a line B—B of Fig. 5. Fig. 7 is a detail view in perspective of a seed-slide used in the machine. Fig. 8 is a detail view in perspective of a rock-bar or shaft used in the machine. Fig. 9 is a detail view in perspective of a slotted plate made use of in the machine for regulating the size of the feed opening in the bottom of the seed-box. Fig. 10 is a rear elevation of portions of the machine illustrating the shipping gear of the machine. Fig. 11 is a sectional side elevation of a portion of one of the runners of the machine. Fig. 12 is a detail view in perspective of a spring held furrow opener, detached. Fig. 13 is a detail sectional side elevation of portions of the forward parts of the machine, illustrating the draft or pole connections. Fig. 14 is a sectional plan view of same. Fig. 15 is a section on line D—D of Fig. 14.

Referring to the drawings: 1 indicates the main frame of the machine, which is composed of an upper central longitudinal-bar 2, lower side bars 3, vertical front standards 4, front cross-bar 5, lower central longitudinal bar 6, rear standards 7, and rear upper cross-bar 8, to which latter the ordinary driver's seat 9 is attached. Braces *b* extend from the upper longitudinal bar 2 to the standards 4 and 7, and greatly stiffen the frame during operation. This main frame is arranged to carry the operative-parts of the seed dropping mechanism, and its rear end is mounted upon and carried by the axle 10, which in turn is secured in the hubs of the ground-wheels 11, so as to rotate in a forward direction with said wheels. The said main frame is further arranged to be tilted or rocked upon said axle, so that the forward portion of the said frame carrying the planting mechanism may be lifted clear of the ground, during the transportation of the machine. This may be accomplished as herein shown by providing the rear ends of the side bars 3 with holes or perforations adjacent their rear terminals, and mounting said bars upon said axle so that rounded portions 12 formed on said axle will engage the holes or apertures in said bars, and thereby permit said axle to turn in said holes or apertures.

13 indicates a casing formed upon or connected to the hub of each wheel 11, within which casing may be located in the ordinary manner the usual pawl and ratchet mechanism now in every day use upon the well known makes of mowing machines and other farm implements, for the purpose of permitting one of said wheels to move forward and rotate the axle 10, while the other wheel remains stationary or revolves upon said axle in a reverse direction in turning around.

14 indicates a caster-wheel which supports the forward end of the machine and permits same to be moved in any direction. This caster-wheel is of the usual construction, being provided with the usual frame 15, which is pivotally secured to the lower portion of said frame by means of a projecting stud or pin or other suitable journal 16.

There is an independent vibrating frame composed of a central lower horizontal bar 6 and lower side bars 3, which supports the planting mechanism, and has a vertical vibratory movement independent of the main frame, so that although the main frame is supported by the ground, the runners may be raised from the ground in turning the machine, and for various other purposes. This vibratory frame is guided in its vertical movements by the vertical front standards 4 being spaced a suitable distance apart, and the forward end of the lower central longitudinal bar 6 being located in the space between said standards so as to be moved freely up and down therein.

17 indicates a hand lever in the form of a bell-crank, which is pivotally mounted at its lower portion upon the upper central longitudinal bar 2 of the main frame, and provided with the usual notched sector 18 and rocking pawl, and connected to the lower central bar 6 by means of a vertical rod or bar 19, said rod or bar passing downward through a slot or opening 20 formed in said upper central bar 2.

The draft apparatus is preferably constructed as follows: 21 indicates the pole or tongue of the machine, having its rear end loosely mounted in a socket formed in the forward portion of the frame, so that it may be readily withdrawn from said socket without carrying the doubletree 22 with it, said double tree being supported in longitudinal straps 23 beneath said pole socket, so as to freely slide back and forth in its mounting. This double tree is not rigidly secured to the machine, on the other hand, it is yieldingly secured thereto, by means of a spring 24, which is mounted between said doubletree and some portion of the frame, in such a manner that the machine cannot be suddenly jerked forward by the draft animals for the reason that said spring will give and act as a cushion for the draft exerted upon it by said animals.

It will be observed that the pole 21 is removable from its socket without disturbing the double tree, said pole being held in place when the animals are hitched up by means of the harness tugs engaging with the single trees 25 and thereby retaining said pole within its socket and preventing its detachment so long as the animals are hitched to the single trees.

26 indicates the seed boxes, located one on each side of the central bar 6 and directly supported upon longitudinal bars or plates 27. These boxes are provided with a removable cover 28, a bottom 29 provided with a feed opening 30, and a spring pressed follower 31. This follower 31 corresponds in size to the dimensions of the interior of the box so as to slide loosely up and down therein, and should have such an amount of weight imposed upon it as to urge the seed contained in said box downward considerably faster than they would move by the action of their own gravity. This follower is provided for use especially in case of planting cotton seed and other finely divided particles and need not be used with the larger grain, such as corn. I prefer to use a spring 32 for the purpose of urging the follower downward, although it is clear that said follower may be made so heavy as to accomplish the desired purpose without the intervention of a spring of such strength. The lower end of this spring bears upon a pin 33, or other support projecting from the vertical stem 34 of the follower, and its upper end rests against a strap or stirrup 35, or some other portion of the cover of the box, said spring encircling said stem, and both of these parts passing through a vertical aperture or opening 36 formed in the cover of said box.

I will confine my description to the construction of a single box in proceeding further, as both boxes are substantially identical.

37 indicates a reciprocating seed slide which is provided with a feed opening 38, and is so mounted in or beneath the bottom of the box that it may reciprocate longitudinally in its bearing and so that said feed opening 38 may register with the feed opening 30 in the bottom of the box at regular intervals during movement of the machine.

39 indicates a feed opening in the stationary plate 27 beneath the said feed slide, and with which the feed opening 38 in said slide registers at regular intervals to drop the seed.

40 indicates a seed spout, the upper end of which connects with the feed opening 39 in the stationary plate, and the lower end of which connects with a longitudinal passage 41 in the runner 42.

The runners of this machine, indicated by the numeral 42 may be of the usual construction, although I prefer the construction herein shown, in which the runner is devoid of the usual forward cutting edge, and has a direct longitudinal passage 41 extending through it and upon it both at the forward and rear ends. In this passage I locate a spring held furrow opener 43, which is pivotally mounted therein upon a pin or journal 44 so as to normally project downward a considerable distance below the lower edge of said runner. (See Fig. 11.) This furrow opener is provided with a knife edge 45 which faces toward the front of the runner, and is normally held in a vertical position by means of a spring 46, one end of which engages an arm 47 formed upon or secured to said furrow opener, and the opposite end of which is secured to the lower end of the seed spout 40 or to some other stationary part of the machine. Reciprocating motion is simultaneously imparted to the seed slides of both seed boxes by the following described means. Said seed slides are normally held at the limit of their forward movement with their openings 38 in position to register with the opening 30 in the bottom of the seed box, by means of springs 48, each having one end secured to the forward end of a seed slide and the opposite end secured to the plate 27 or some other fixed portion of the machine, so that when said seed slides are withdrawn from their normal position by any means and then released, they will be automatically returned to said position.

A rock-shaft or bar 49 having end journals 50 is mounted to rock or move axially in bearings 51 formed in the lower side bars 3 of the vibrating-frame. This rock bar or shaft is provided with a projection or tappet 52 which projects rearward and is adapted to be engaged at regular intervals during the forward motion of the machine by projecting lugs 53 carried by a wheel 54, which latter is mounted upon the axle 10. This wheel 54 is not fixed upon said axle, but is adapted to be splined thereon, or otherwise secured so as to revolve with said axle but be moved transversely of the machine so as to throw the lugs 53 out of the path of the tappet 52 of said rock-bar, for a purpose hereinafter mentioned. I accomplish this by making use of a square or angular axle and provide said wheel with a corresponding angular bar, as shown. For moving said wheel laterally I provide a lever 55 which is pivotally mounted about midway of its length, upon the transverse seat-bar 8, so that its lower end will project downward through an opening or slot in said bar and engage the hub of said wheel, in a manner now to be described. The lower end of the lever 55 is provided with a fork or bifurcation 56, which engages the annular groove 57 formed in the hub 58 of said wheel 54, in such a manner that said hub may freely rotate and yet be slid back and forth upon said axle. The lever 55 is provided with the usual notched sector 59, which in turn is provided with two separate notches or depressions 60, for a purpose hereinafter mentioned.

The connection between the rock bar 49 and the seed slides 37 may be made in any known manner, although I prefer to extend the rear ends of said slides rearwardly and connect them to a vertical arm 61 projecting from said rock-bar. This connection I make by means of a short link 62.

For regulating the size of the feed opening 30 in the bottom of the feed boxes, I provide each box with a plate 63 which is provided with a slot 64, and locate this plate adjacent said feed opening 30, so that it may be adjusted to increase or diminish the area of said opening, according to the size of the seed to be planted. This plate 63 is held in position by means of a screw 65 passing through the slot 64 therein and engaging the bottom of the box.

The operation is as follows: Upon the machine being moved forward by the draft animals, the ground wheels 11 will be rotated in a corresponding direction, and the projections 53 upon the wheels 54 alternately come in contact with the tappet 52 on the rock-bar 49, provided the hand lever 55 is properly adjusted. To perform the above function the hand lever 55 should be in the position shown in solid lines in Fig. 10, with its dog or pawl in engagement with the notch 60 in the sector 59. When the said lever is thrown to the position indicated by dotted lines, the wheel 54 will be thrown to one side of the axle 10, so that it will revolve with the lugs 53 out of the path of the tappet 52. This last adjustment of the lever 55 should be made use of when the machine is going to or coming from the field, turning a corner, &c., so that the seed slides will not be reciprocated during such operation. Upon contact of one of the lugs 53 with the tappet 52 of the rock-bar 49, said bar will be moved a corresponding distance in its bearings, the upper ends of the arms 61 will be thrown rearward, and they being connected to the seed slides said seed slides will be thrown rearward a corresponding distance until their feed openings 38 register with the feed openings 39 in the plates 27, and the seed which has previously dropped into said feed openings 38 in said slides will be dropped into the seed spout 40, and then as the forward movement of the machine continues, said projection 53 will release said tappet 52 and the springs 48 of the seed slides will cause all these parts to return to their normal position. The normal position of said slides and adjacent parts is that shown in Fig. 5. As the seed in the seed box beneath the followers 31 recedes during operation, the followers pass downwardly a corresponding distance. The seed delivered into the seed spouts 40 gravitates downward through the space 41 in the runners 42 and into the furrow previously opened by the furrow opener 43, and as the forward movement still further continues the furrow is closed by the wheels 11. Should one of the furrow openers 43 strike an obstruction such as a stone or a root, it will not be injured, but will yield rearwardly and pass over the obstruction, and resume its normal position after the obstruction has been passed (see Fig. 11).

Having fully described my invention, what I claim is—

1. The improved corn or cotton planter constructed with a main frame 1, having its rear end pivotally mounted upon the axle 10 of the ground wheels, a caster-wheel 14 supporting the forward end of said frame, said frame having a central upper longitudinal bar 2, front vertical standards 4 spaced apart, rear standards 7, a vertical vibrating frame carrying the planting mechanism, also having its rear end pivotally mounted upon said axle and having a central longitudinal bar 6 located in the space between said vertical bars 4, and a hand lever 17 in the form of a bell crank mounted upon the upper central longitudinal bar and connected to raise or lower said vibrating frame, and proper draft apparatus, substantially as herein specified.

2. In a corn or cotton planter, a seed box having a removable cover 28 provided with an opening or passage 36 and a stirrup or strap 35, in combination with a follower 31 located within said boxes and provided with a vertical stem 34, a pin or projection 33 formed upon or secured to said stem adjacent said follower within the box, and a spring 32, encircling said stem and located in the opening 36 in said cover, with its upper end in engagement with said stirrup or strap and its lower end in contact with said projection 33 on said stem, substantially as herein specified.

3. In a corn or cotton planter, a runner 42 provided with a longitudinal opening 41 open at both forward and rear ends and under side, in combination with a spring-held furrow opener 43 pivoted within the passage in said runner so as to normally project a distance below the lower edge thereof, and a spring 46 which retains said furrow opener in such normal position, substantially as herein specified.

In testimony whereof I affix my signature in presence of two witnesses.

HENRY H. PIEPER.

Witnesses:
FREDK. LONG,
DANIEL DITCH.